United States Patent
Bodin et al.

(10) Patent No.: US 6,869,130 B2
(45) Date of Patent: Mar. 22, 2005

(54) INNER PANEL FOR A VEHICLE DOOR

(75) Inventors: Hans Bodin, Sodra Sunderbyn (SE); Paul Akerstrom, Ranea (SE)

(73) Assignee: SSAB Hardtech AB, Lulea (SE)

( * ) Notice: Subject to any disclaimer, the term of this patent is extended or adjusted under 35 U.S.C. 154(b) by 0 days.

(21) Appl. No.: 10/632,015

(22) Filed: Jul. 31, 2003

(65) Prior Publication Data

US 2004/0036316 A1 Feb. 26, 2004

Related U.S. Application Data

(63) Continuation-in-part of application No. PCT/SE02/00079, filed on Jan. 18, 2002.

(30) Foreign Application Priority Data

Feb. 2, 2001 (SE) ................................ 0100356

(51) Int. Cl.[7] ................................ B60J 5/04
(52) U.S. Cl. .............. 296/146.6; 296/187.12; 52/734.1; 52/735.1
(58) Field of Search ............. 296/146.6, 187.12, 296/187.03; 52/731.6, 734.1, 735.1

(56) References Cited

U.S. PATENT DOCUMENTS

| | | | | |
|---|---|---|---|---|
| 4,090,734 A | * | 5/1978 | Inami et al. | 296/146.6 |
| 5,137,325 A | * | 8/1992 | Ohya | 296/187.12 |
| 5,542,738 A | | 8/1996 | Walker et al. | |
| 5,600,931 A | * | 2/1997 | Jonsson | 52/720.3 |
| 5,785,376 A | | 7/1998 | Nees et al. | |
| 5,887,938 A | | 3/1999 | Topker et al. | |
| 5,992,922 A | * | 11/1999 | Harbig et al. | 296/146.6 |
| 6,290,282 B1 | * | 9/2001 | Hortlund et al. | 296/146.6 |
| 6,302,473 B1 | * | 10/2001 | Weber | 296/146.6 |
| 6,416,114 B1 | * | 7/2002 | Topker et al. | 296/146.6 |
| 6,554,345 B2 | * | 4/2003 | Jonsson | 296/146.6 |
| 6,641,207 B1 | * | 11/2003 | Passone | 296/146.6 |
| 6,663,169 B2 | * | 12/2003 | Gehringhoff et al. | 296/187.12 |
| 2002/0043817 A1 | * | 4/2002 | Gehringhoff et al. | 296/146.6 |

FOREIGN PATENT DOCUMENTS

| | | |
|---|---|---|
| SE | 501812 | 5/1995 |
| SE | 509041 | 11/1998 |

* cited by examiner

Primary Examiner—Patricia L. Engle
(74) Attorney, Agent, or Firm—Mark P. Stone

(57) ABSTRACT

A vehicle door has an inner panel (11) on which an outer panel is fitted. The inner panel is covered by a loose panel, the trim. The inner panel has a front end wall (12) and a rear end wall (13). A reinforcement beam (20) is fastened between the end walls for transmitting force from a door pillar (33) to which the door is attached to a door pillar (34) behind the door, in the event of a collision. The reinforcement beam has a high single hat profile (21) which is fastened to the upper part of the front end wall, and extends in a curve out towards the external part of the inner panel, where the profile height is lower. The profile height decreases continuously from the high profile height to the low profile height, and the single hat profile (21) extends into a double hat profile (22). The reinforcement beam also functions as a side impact guard.

17 Claims, 4 Drawing Sheets

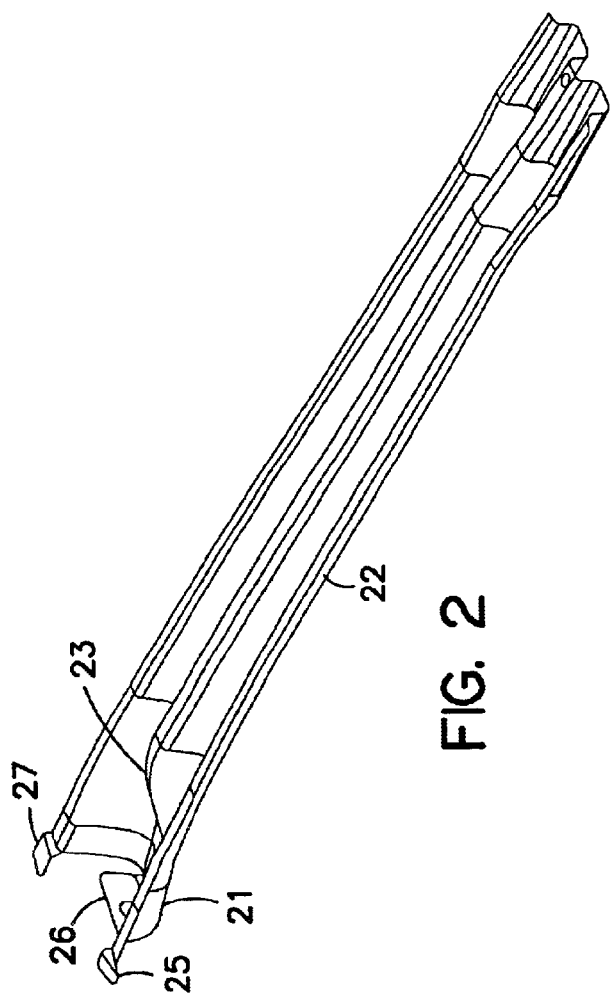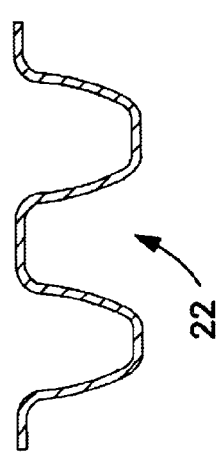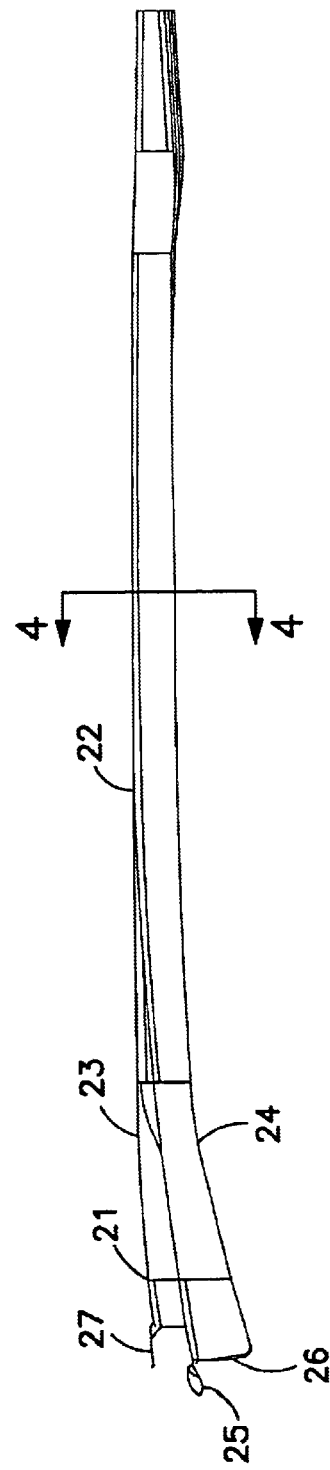

INNER PANEL FOR A VEHICLE DOOR

This application is a continuation-in-part of International Application PCT/SE02/00079, having an International filing date of Jan. 18, 2002.

FIELD OF INVENTION

The present invention relates to a vehicle door inner panel comprising a front end wall, a rear end wall and a reinforcing beam attached between said walls, such as to enable impact forces emanating from a collision to be transmitted from the door pillar or pillar to which the door is attached to the door pillar situated behind the door.

DESCRIPTION OF THE BACKGROUND ART

Car doors are typically comprised of an inner panel, which forms the supportive part of the door, and a lacquered outer panel. The inner panel is covered with a detachable panel, i.e. so-called trim.

In the construction of a car, it can be chosen to allow the door to transmit force or load from the A-pillar to the B-pillar, in the event of a frontal collision. A-pillar is the accepted designation of the windscreen-adjacent pillar on which the front door is hung, while B-pillar is the designation of the pillar situated behind the front door, i.e. between the doors when two doors are situated on respective sides.

In order to provide hinge space, these two pillars do not normally reach the outsides of the doors. The beam located beneath the window, the waist rail, is situated on the inside of the window and often overlaps the pillars, so as to be able to transmit force directly between the pillars. However, it is disadvantageous to give this beam a high degree of rigidity or stiffness, since it is desirable for the door to yield in the event of a side-on impact. A side impact guard will preferably be situated as far out in the door as possible, so as to obtain the largest possible deformation zone, and car models exist which have a straight beam or bar which is located on the outside of the side-window guide rails and fixed in bracket means which are welded to the end walls of the inner panel and extend towards the insides of said walls, so as to overlap the pillars and therewith be able to transmit force between the pillars and the side impact beam. Consequently, the beam is able to transmit force between the pillars, in addition to functioning as a side impact guard.

OBJECT OF THE INVENTION

An object of the present invention is to simplify a construction which includes a beam that functions as side impact guard and, at the same time, is capable of transmitting force between the door pillars in the event of a frontal collision. In principle, this object is fulfilled with a reinforcing beam that has a high single hat profile which is attached to the upper part of the front end wall and which curves out towards the outer part of the inner panel where the profile height is lower, wherewith the height of the profile decreases continuously from the high profile height to the low profile height. The invention is characterised by the characteristic features set forth in the accompanying claims.

BRIEF DESCRIPTION OF THE DRAWINGS

FIG. 2 is a perspective view of a beam, also shown in FIG. 1.

FIG. 3 is a wire model in side view of the beam shown in FIG. 2.

FIG. 4 is a sectional view taken on the line 4—4 in FIG. 3.

DETAILED DESCRIPTION OF THE EMBODIMENT SHOWN IN FIG. 1

Figure 1:
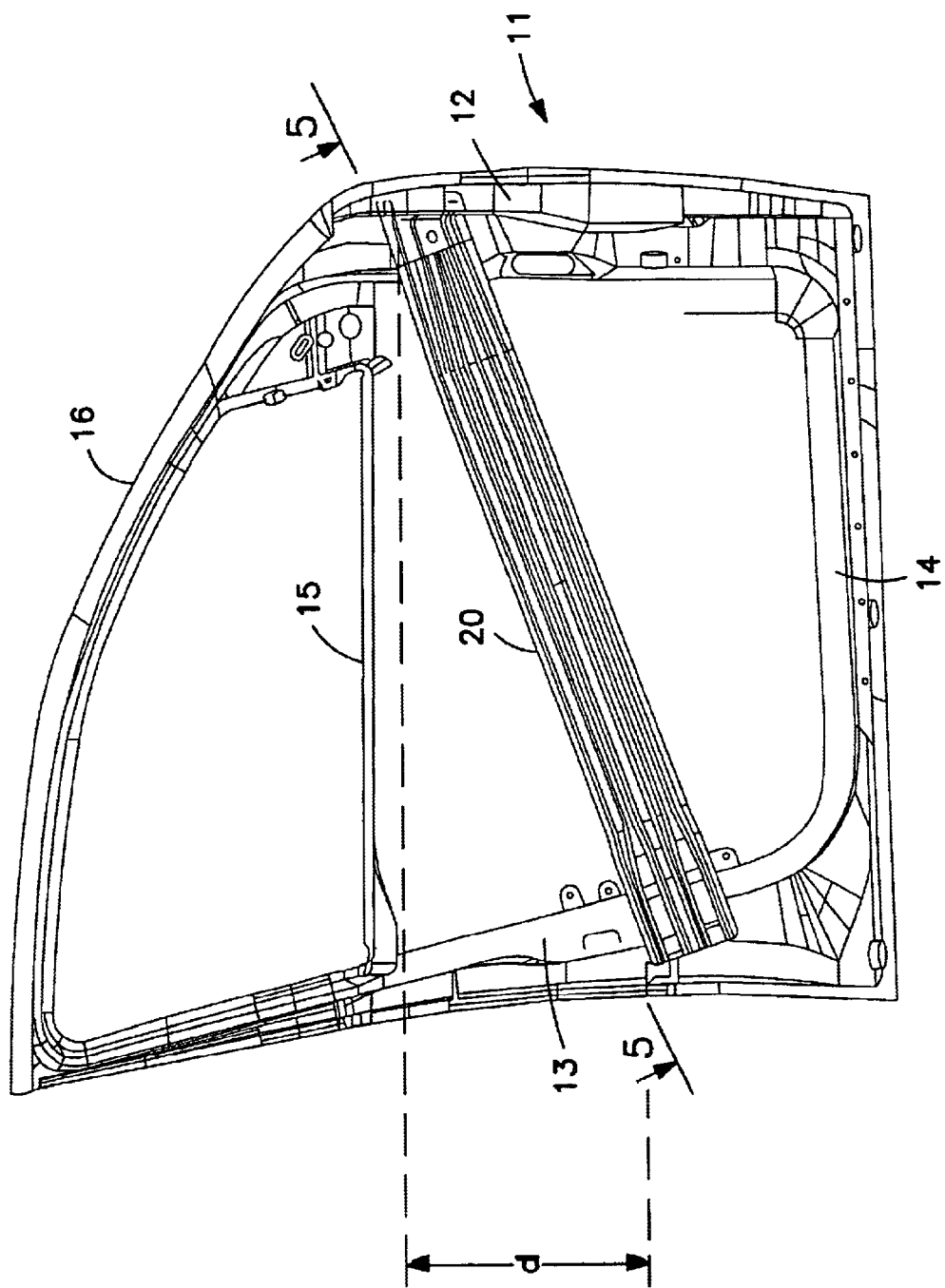
FIG. 1 is an outside side view of an exemplifying embodiment of an inventive inner vehicle door panel.
Figure 5:
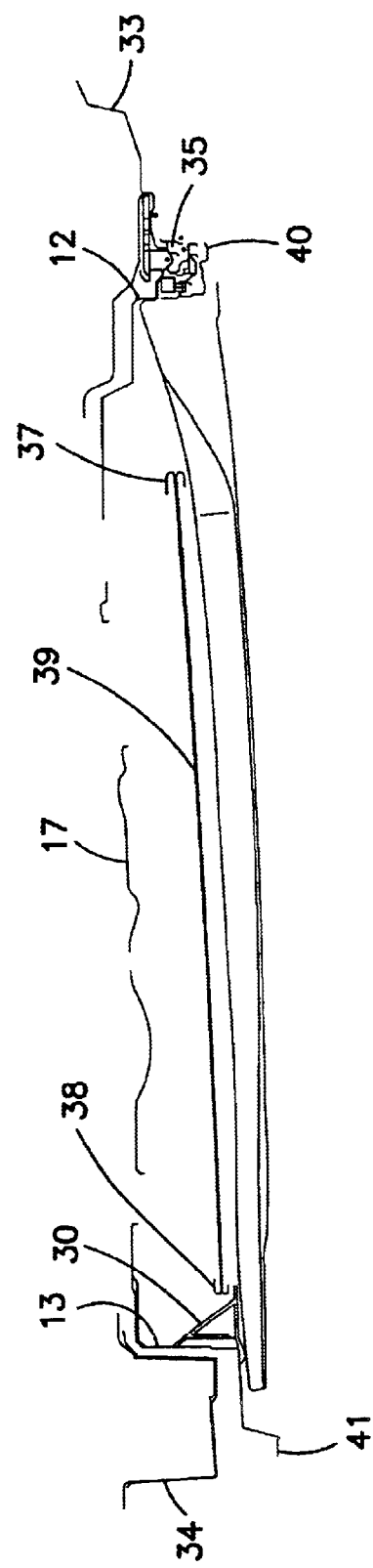
FIG. 5 is a sectional view taken on the line 5—5 in FIG. 1, and also shows the A-pillar and the B-pillar of the vehicle.

FIG. 1 shows the inner panel 11 of a vehicle door as seen from the outside. The inner panel has a front end wall 12, a rear end wall 13, a bottom 14, a beam 15 (waist beam or waist rail) and a window arch 16. The inner panel has a side 17 which faces towards the vehicle interior and which includes a number of holes and recesses. These holes and recesses are not shown in FIG. 1, but are shown in FIG. 5. The holes are required for mounting all door fittings. A stiffening or reinforcing beam 20 is fitted between the front end wall and rear end wall and slopes rearwardly. As shown in FIG. 1, the front end of the reinforcement beam 20 is connected to the front end wall 12 at an elevation above the midpoint of the front end wall, and the rear end of the reinforcement beam 20 is connected to the rear end wall 13 at an elevation below the midpoint of the rear end wall. The front end of the reinforcement beam 20 is elevated above the rear end of the reinforcement beam 20 by a distance designated by d which is at least a minimum of 5 millimeters. The distance d can also be at least a minimum of 10 millimeters. The reinforcement beam 20 continuously slopes rearwardly and downwardly in a direction from the front end wall to the rear end wall.

FIG. 2 is a perspective view of the beam 20. The front end 21 of the beam has a section in the form of a high-profile hat beam. As is known to those skilled in the art, a "hat" beam is a beam having a profile or cross section including a closed bottom, an opened top, two opposed sidewalls, and flanges extending outwardly from the tops of the opposed sidewalls. This high single hat profile extends continually to become a low double hat profile 22, whereby the beam obtains a bend or curve 24 in the transition region 23. The forward end includes attachment tabs 25, 26, 27 which are intended for spot-welding to the front end wall 12. FIG. 3 shows the beam 20 from one side as a wire model, and FIG. 4 shows the double hat profile (consisting of two single hat profiles joined together by a common intermediate flange), which is practically constant over the major part of the length of the beam. It is changed slightly at the rear end, which is adapted for spot-welding to a bracket means 30 attached to the rear end wall, as shown in FIG. 5, which is a sectional view taken through the inner panel along the beam, as indicated by the line 5—5 in FIG. 1. As illustrated in the drawings, the reinforcement beam 20 is mounted to the front end wall 12 and rear end wall 13 such that the closed ends of the single and double hat profiles are directed inwardly into the interior of the vehicle, and the opened ends of the single and double hat profiles face outwardly from the vehicle.

The beam 20 is formed from a sheet-metal blank. It can be conveniently shaped and hardened by press hardening, i.e., shaped in cold tools and hardened directly in the tools with said tools functioning as a fixture or jig. Very high mechanical strength values with respect to the steel can be achieved with this method.

FIG. 5 shows the A-pillar 33 and the B-pillar 34 of the vehicle. [As known to those skilled in the art, the A-pillar is at the windshield of a vehicle, the B-pillar is between the doors of a vehicle, and the C-pillar is behind the doors of a vehicle]. The upper hinge 35 of the inner panel is shown fastened in the A-pillar. The front end of the reinfocement beam 20 is attached to, or in close proximity to the upper hinge 35, and the rear end of the reinforcement beam 20 is attached to the rear end wall 13 close to a door lock. The bracket means 30 extends inwards to an extent at which it overlaps the B-pillar and is thus able to transmit load force, to said pillar in the event of a frontal collision. In the case of a collision of this nature, the force is transmitted from the A-pillar to the beam 20 through the medium of the hinge 35. Also shown in the figure are the window guide rails 37, 38. Although the beam does not obstruct the path of the window, the rear end of the beam cannot be given the same design as the front end of the beam, because the rear guide rail 38 lies so close to the rear end wall, but must be fastened in a bracket means 30. Thus, the front end of the reinforcement beam 20 is directly connected to the front end wall 12 of the vehicle door inner panel, and the rear end of the reinforcement beam 20 is connected to the rear end wall of the vehicle door inner panel through the bracket 30. The tolerance in the distance between the front end wall 12 and the rear end wall 13 is normally such that an adjustment between the bracket 30 and the beam is necessary. The front end of the reinforcement beam is mounted to the front end wall 12, the bracket is mounted to the rear end wall 13, and the rear end of the reinforcement beam and the bracket are spot welded together. The beam is shown to slope downwards/rearwards. If the beam were to be given a steeper slope, its rear end can be located beneath the guide rail 38 and therewith enable the rear end of the beam to be given the same design as its front end and the rear bracket means 30 omitted. The outer panel of the door has not been shown. However, the outer panel can be folded around the edges 40, 41 of the inner panel and fastened thereto, normally glued thereto.

Figure 6:
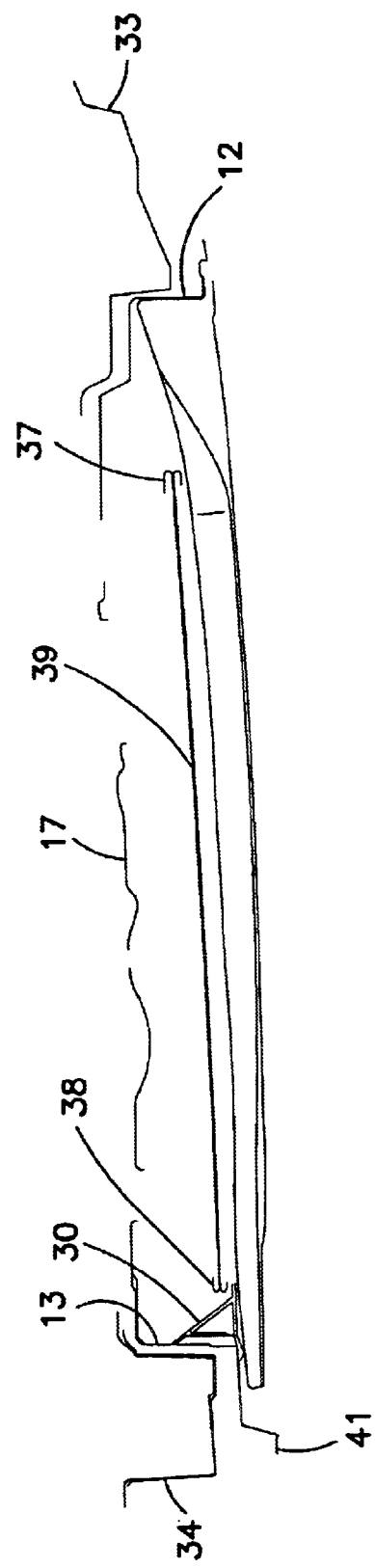
FIG. 6 is a fragmentary sectional view corresponding to the view of FIG. 5 but showing a modified A-pillar, said Figure also showing the attachment of the beam in FIG. 2 slightly lower in the A-pillar than that shown in FIG. 1.

If the front end of the beam 20 is fastened slightly further down on the front end wall than that shown in FIG. 1, i.e. lower than the upper hinge, the front end of the beam and the A-pillar can mutually overlap, as shown in FIG. 6, therewith enabling the force to be transmitted directly from the A-pillar to the beam.

As a result of the bend or curve in the hat beam 20, the beam will be strongest in its longitudinal direction when the crown of the curve faces inwardly into the vehicle interior and its open side faces outwards, as shown. If it were turned in the other direction, it would have a stronger function as a side impact guard, although it is normally dimensioned in accordance with axial load and will therefore be sufficiently strong as a side impact guard even when turned to face in the illustrated direction.

The illustrated beam has a high single hat profile which merges into a low double hat profile. A low double hat profile is beneficial, since it enables the width of the blank to be utilised and provides a sufficiently strong beam despite the low and open profile. However, the high single hat profile may, alternatively, be allowed to merge into a low single hat profile. However, in this latter case, it is necessary in the majority of cases to reinforce the low single hat profile with some form of cover or to use thicker material. Other profiles are also conceivable on the low part of the beam.

The beam is inclined in the illustrated embodiment of the invention. It is advantageous to take-up the load high up on the A-pillar and transmit the load down to a lower level on the B-pillar, since the vehicle is usually strongest in the vicinity of its floor. Moreover, the beam will have an effective height as a side impact guard with respect to the hips of a passenger or the driver.

Although the invention is shown as applied to a front door, it can also be applied to a rear door, in which case the beam is able to transmit load from the B-pillar to the C-pillar.

What is claimed is:

1. A vehicle door inner panel comprising a front end wall (12), a rear end wall (13), a waist rail (15), and a reinforcement beam (20) fastened between said end walls for transmitting force from a first door pillar (33) to which the door is fastened to a second door pillar (34) situated behind said door in the event of a collision, characterised in that the reinforcement beam (20) is formed, at least in part, as a single hat profile (21), a front end of said reinforcement beam being connected to said front end wall (12), and a rear end of said reinforcement beam being connected to said rear end wall, the front end of said reinforcement beam being connected to said front end wall at a location on said front end wall above the location at which said rear end of said reinforcement beam is connected to said rear end wall such that the height of said reinforcement beam decreases continuously from the front end of said reinforcement beam to the rear end of said reinforcement beam, said inner panel adapted to be hung on the A-pillar (33) of the vehicle, the attachment end (21) of the reinforcement beam in the front end wall (12) of the inner panel overlapping the A-pillar when the door is fitted, the single hat profile (21) of said front end of said reinforcement beam (20) extending into a double hat profile (22) in a direction towards said rear end of said reinforcement beam (20).

2. The vehicle door inner panel as claimed in claim 1, characterised in that the front end of said reinforcement beam (20) is directly connected to the front end wall (12), and the rear end of said reinforcement beam (20) is connected to the rear end wall (13) through a bracket (30).

3. A vehicle door inner panel comprising a front end wall (12), a rear end wall (13), and a reinforcement beam (20) fastened between said front and rear end walls for transmitting force from a first door pillar (33) to which the door is fastened to a second door pillar (34) situated behind said door in the event of a collision, characterised in that the reinforcement beam (20) is formed from first and second portions merging together, said first portion formed as a single hat profile, and said second portion formed as a double hat profile; said single hat profile formed from a single open channel having first and second outer flanges extending, respectively, outwardly from opposed sides of said opened channel, said first and second outer flanges also extending longitudinally along said reinforcement beam; said double hat profile formed from two opened channels, a common inner flange connecting adjacent inner sidewalls of said two open channels, and said first and second outer flanges extending outwardly from outer sides of said first and second opened channels, respectively.

4. The vehicle door inner panel as claimed in claim 3, wherein the height of said single hat profile forming said first portion of said reinforcement beam is greater than the height of said double hat profile forming said second portion of said reinforcement beam.

5. The vehicle door inner panel as claimed in claim 4, wherein the height of said double hat profile continuously decreases in a direction away from said first portion of said reinforcement beam defining said single hat profile.

6. The vehicle door inner panel as claimed in claim 3, wherein said first portion of said reinforcement beam (20) is mounted to said front end wall (12), and said second portion of said reinforcement beam is mounted to said rear end wall (13).

7. The vehicle door inner panel as claimed in claim 6, wherein said first portion of said reinforcement beam is mounted to said front end wall above the midpoint of said front end wall, and said second portion of said reinforcement beam is mounted to said rear end wall below the midpoint of said rear end wall.

8. The vehicle door inner panel as claimed in claim 7, wherein said first portion of said reinforcement beam is mounted to said front end wall at least 10 mm. above the location at which said second portion of said reinforcement beam is mounted to said rear end wall.

9. The vehicle door inner panel as claimed in claim 7, wherein said first portion of said reinforcement beam is mounted to said front end wall at least 5 mm. above the location at which said second portion of said reinforcement beam is mounted to said rear end wall.

10. The vehicle door inner panel as claimed in claim 3, wherein the forward end of said first portion of said reinforcement beam (20) includes tabs (25, 26, 27) for mounting said forward end to said front end wall (12).

11. The vehicle door inner panel as claimed in claim 3, wherein said reinforcement beam (20) is mounted in said vehicle door inner panel such that said reinforcement beam continuously slopes downwardly and rearwardly in a direction between said front end wall (12) and said rear end wall (13).

12. The vehicle door inner panel as claimed in claim 3, wherein said inner panel is adapted to be hung on an A-pillar (33) of the vehicle, and the first portion of said reinforcement beam (20) mounted to said front end wall is attached to, or in close proximity to, an upper hinge (35) of said door inner panel.

13. The vehicle door inner panel as claimed in claim 12, wherein said second portion of said reinforcement beam (20) mounted to said rear end wall (13) is attached to said rear end wall of said inner panel in close proximity to a door lock.

14. The vehicle door inner panel as claimed in claim 3, wherein said first portion (21) of said reinforcement beam (20) merges into said second portion (22) of said reinforcement beam (20) through a transition region (23) including a protrusion which continuously increases in height in a direction towards said second portion of said reinforcement beam, the profile height of said reinforcement beam being continuously reduced in said transition region in a direction towards said second portion of said reinforcement beam.

15. The vehicle door inner panel as claimed in claim 14, wherein said transition region is longer than said first portion of said reinforcement beam.

16. The vehicle door inner panel as claimed in claim 14, wherein said second portion of said reinforcement beam is longer than the combined length of said first portion of said reinforcement beam and said transition region.

17. The vehicle door inner panel as claimed in claim 14, wherein said second portion of said reinforcement beam is longer than the said first portion of said reinforcement beam.

* * * * *